(12) United States Patent
Yoo et al.

(10) Patent No.: US 6,687,210 B2
(45) Date of Patent: Feb. 3, 2004

(54) HIGH-DENSITY INFORMATION STORAGE APPARATUS USING ELECTRON EMISSION AND METHODS OF WRITING, READING AND ERASING INFORMATION USING THE SAME

(75) Inventors: In-kyeong Yoo, Kyungki-do (KR); Won-bong Choi, Kyungki-do (KR); Byong-man Kim, Kyungki-do (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 8 days.

(21) Appl. No.: 10/090,629

(22) Filed: Mar. 6, 2002

(65) Prior Publication Data

US 2003/0053399 A1 Mar. 20, 2003

(30) Foreign Application Priority Data

Sep. 20, 2001 (KR) ........................................ 2001-58360

(51) Int. Cl.[7] ................................................ G11B 7/00
(52) U.S. Cl. ..................................................... 369/126
(58) Field of Search ............................. 369/126, 275.3, 369/47.2, 47.23, 127

(56) References Cited

U.S. PATENT DOCUMENTS 6,249,503 B1 * 6/2001 Aratani ....................... 369/126

* cited by examiner

Primary Examiner—Nabil Hindi
(74) Attorney, Agent, or Firm—Burns Doane Swecker & Mathis, LLP

(57) ABSTRACT

A high-density information storage apparatus using electron emission and methods of writing, reading and erasing information using the same are provided. The high-density information storage apparatus includes a lower electrode, a photoconductive layer and a recording medium sequentially provided on the lower electrode, a conductive layer converting unit for making the photoconductive layer conductive, a data write and read unit for writing data to the recording medium or reading data from the recording medium, a data loss preventing unit for preventing loss of data during data write and read operations, and a power supply connected to the lower electrode and the data write and read unit, for supplying voltage necessary for reading and writing data.

60 Claims, 11 Drawing Sheets

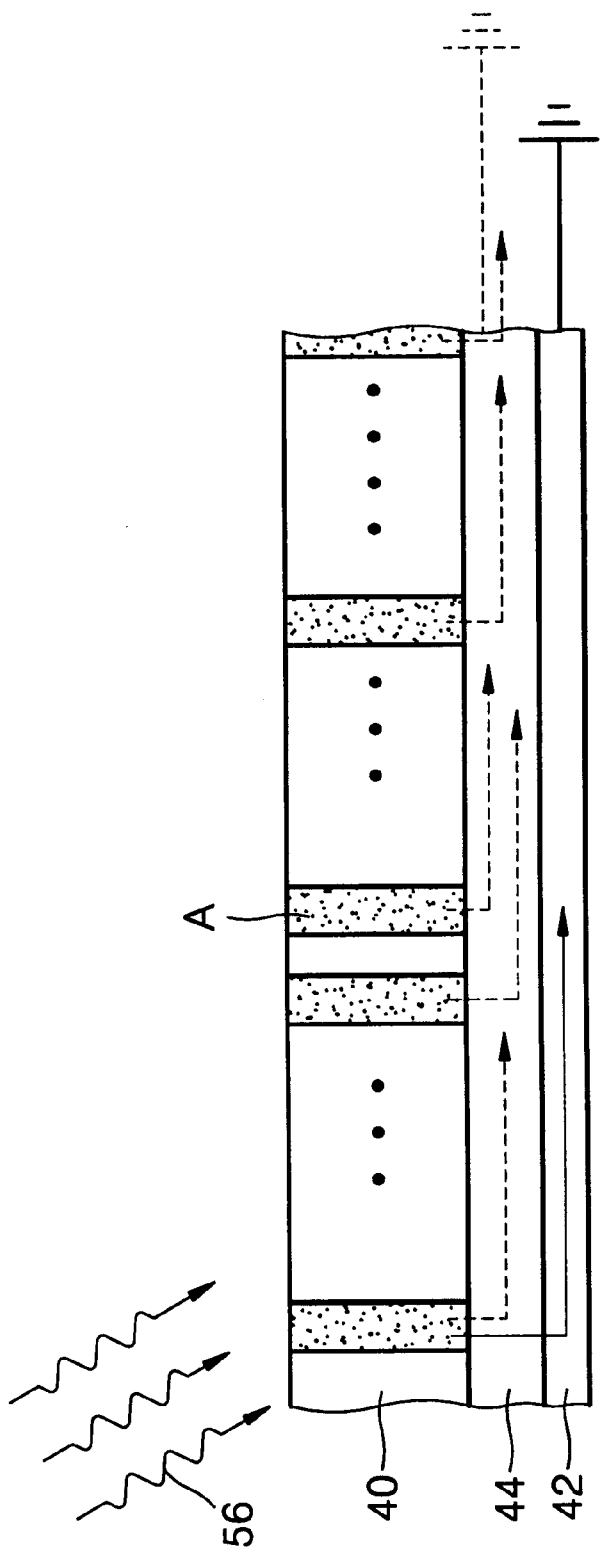

HIGH-DENSITY INFORMATION STORAGE APPARATUS USING ELECTRON EMISSION AND METHODS OF WRITING, READING AND ERASING INFORMATION USING THE SAME

Priority is claimed to Patent Application Number 2001-58360 filed in the Republic of Korea on Sep. 20, 2001, herein incorporated by reference.

BACKGROUND OF THE INVENTION

1. Field of the Invention

The present invention relates to an information storage apparatus and methods of writing, reading and erasing information using the same, and more particularly, to a high-density information storage apparatus using electron emission and methods of writing, reading and erasing information using the same.

2. Description of the Related Art

Recently, as recording media enabling high-density recording are developed, devices using them have been developed. Information storage apparatuses with a high-density information recording medium such as CDs or DVDs write information to the high-density recording medium, or read or erase information from the high-density recording medium using a laser. Accordingly, it is preferable to use a short-wavelength laser beam which can reduce the area of a beam spot formed on the surface of a high-density recording medium in order to write information to the high-density recording medium.

Since there is a limit in decreasing the wavelength of a laser beam, the performance of information storage apparatuses for writing, reading and erasing information using a laser beam is also limited.

Meanwhile, vertical magnetic recording apparatuses which use a probe instead of a laser for writing, reading and erasing information have limited storage performance depending on the size of the probe.

Therefore, there have been provided alternative methods of bringing a tip, which is used for a scanning probe microscope (SPM) or an atomic force microscope (AFM), in contact with or close to a recording medium to write, read or erase information. The AFM falls under the SPM and uses atomic force between a tip and a sample. However, such methods have problems with abrasion and vibration of a tip and slow recording and writing speed.

FIG. 1 is a schematic diagram of a disc apparatus using a conventional SPM probe. Referring to FIG. 1, the disc apparatus includes a disc 8, a head 9, and an optical system 100. The disc 8 includes a circular substrate 8a, an electrode layer 8b formed on the circular substrate 8a, and a ferroelectric layer 8c formed on the electrode layer. The head 9 includes a microtip 9a for writing information by polarizing the ferroelectric layer 8c and for plying the surface of the disc 8 by an amount corresponding to a quarter of the wavelength of light in a vertical direction from the surface of the disc 8 according to the polarity of the dielectric polarization to read information, and a reflective unit for reflecting light. The optical system 100 recognizes a difference in optical path attendant on the vertical reciprocating motion of the head 9 to detect the recording information.

For the disc 8, the electrode layer 8b and the ferroelectric layer 8c, to which information is written using dielectric polarization, are sequentially stacked on the circular substrate 8a. The head 9 is realized as an SPM probe. The head 9 includes a microtip 9a, a reflector 9b for reflecting light, and an arm 9c for supporting the microtip 9a and the reflector 9b. The optical system 100 includes a laser diode, i.e., a light source 1, a collimating lens 2 for converting light emitted from the light source 1 into a parallel beam, a beam splitter 3 for transmitting light and reflecting light reflected from the disc 8, an objective lens 5 for focusing light onto a track of the disc 8 to a diffraction limit, a focusing lens 4 for focusing the reflected light, and a photodetector 7 for converting the focused reflected light into an electrical signal.

The disc apparatus operates according to the following principle. When a slight portion of a ferroelectric film deposited on an electrode plate is polarized using a microtip electrode, the polarized portion can be discriminated from an unpolarized or reverse polarized portion by moving the microtip 9a to which a predetermined voltage is applied and understanding a difference in electrostatic force therebetween. Accordingly, a different magnitude of electrostatic force is applied to the microtip 9a of the head 9, to which the predetermined voltage is applied, according to the degree of polarization on the surface of the disc 8. The electrostatic force raises or drops the microtip 9a by $\lambda/4$. Only light having an optical path difference of $\lambda/2$ is split by the beam splitter 3 to be incident to the photodetector 7 and then detected by the photodetector 7.

As described above, in the SPM technique of measuring phenomena acting between a probe and a sample using physical instruments and laser beams, it is required that the tip of the probe be extremely close to the sample, and the tip be very sharp. Accordingly, the tip is easily worn away. When the tip is worn away or vibrates, the distance between the tip point and the sample changes, which makes it difficult to precisely write or read information. In addition, a high degree of dependence on the flatness of a recording medium results in relatively low information writing or reading speed.

SUMMARY OF THE INVENTION

To solve the above-described problems, it is a first object of the present invention to provide an information storage apparatus for overcoming a problem of abrasion or vibration of a member such as a tip used for writing and reading information, preventing information writing and reading speed from dropping, and storing much more information in a unit area.

It is a second object of the present invention to provide methods of writing, reading and erasing information using the above information storage apparatus.

To achieve the first object of the invention, there is provided a high-density information storage apparatus including a lower electrode, a photoconductive layer and a recording medium sequentially provided on the lower electrode, a conductive layer converting unit for making the photoconductive layer conductive, a data write and read unit for writing data to the recording medium or reading data from the recording medium, a data loss preventing unit for preventing loss of data during data write and read operations, and a power supply connected to the lower electrode and the data write and read unit, for supplying voltage necessary for reading and writing data.

Here, the recording medium is a material layer in which the conductivity changes when charged particles are injected thereto and is realized as an amorphous dielectric substrate. The data write and read unit is a charged particle emitting unit which writes data by injecting charged particles into the recording medium and reads data by detecting charged particles emitted from the recording medium.

The high-density information storage apparatus further includes a gate between the charged particle emitting unit and the recording medium. The gate allows only some of the charged particles emitted from the charged particle emitting unit (the recording medium) to reach the recording medium (the charged particle emitting unit).

The power supply includes a first power supply for applying a predetermined voltage between the lower electrode and the gate, and a second power supply for applying a predetermined voltage between the gate and the charged particle emitting unit.

The charged particle emitting unit includes an emitter for emitting charged particles, and an emitter holder connected to the power supply and disposed above the recording medium, for controlling the motion of the emitter.

In addition, the data loss preventing unit is a charged particle control unit for controlling charged particles emitted from the emitter so that they reach a predetermined region of the recording medium directly below the emitter or controlling charged particles emitted from the recording medium so that they reach the emitter directly above the recording medium. The data loss preventing unit is realized as a magnet. Here, the magnet includes a first magnet provided above the emitter holder and a second magnet provided below the lower electrode. The first and second magnets may be realized as a single permanent magnet or as separated permanent magnets. The first and second magnets may be realized as a single electromagnet or as separated electromagnets that have opposite poles facing each other. The magnet may be an electromagnet surrounding at least the charged particle emitting unit and the recording medium.

The conductive layer converting unit is a light source radiating light onto the photoconductive layer and is provided proximal to and above the recording medium, provided at the emitter holder and surrounding the emitter, or provided at the emitter holder but separated from the emitter.

The high-density information storage apparatus further includes a second photoconductive layer and a second recording medium onto which the conductive layer converting unit radiates light, the second photoconductive layer and the second recording medium being sequentially provided on the lower surface of the lower electrode; and a second data write and read unit provided below the second recording medium. Here, the second data read and write unit is a second charged particle emitting unit having the same function as the data read and write unit with respect to the second recording medium. The second charged particle emitting unit is configured in the same manner as the charged particle emitting unit.

The data loss preventing unit is a charged particle control unit for controlling charged particles emitted from the emitter so that they reach a predetermined region of the recording medium directly below the emitter or controlling charged particles emitted from the recording medium so that they reach the emitter directly above the recording medium, and for controlling charged particles emitted from the second emitter so that they reach a predetermined region of the second recording medium directly below the second emitter or controlling charged particles emitted from the second recording medium so that they reach the second emitter directly above the second recording medium. Here, the charged particle control unit is realized as a permanent magnet or electromagnet.

The conductive layer converting unit is a light source radiating light onto the photoconductive layer and the second photoconductive layer. The conductive layer converting unit includes a first light source provided proximal to and above the charged particle emitting unit and a second light source provided proximal to and below the second charged particle emitting unit, a first light source provided at the emitter holder and surrounding the emitter and a second light source provided at the second emitter holder and surrounding the second emitter, or a first light source provided at the emitter holder but separated from the emitter and a second light source provided at the second emitter holder but separated from the second emitter.

The lower electrode includes a first lower electrode contacting the photoconductive layer and a second lower electrode contacting the second photoconductive layer and insulated from the first lower electrode. Here, the conductive layer converting unit is a light source radiating light onto the photoconductive layer and the second photoconductive layer and is provided between the first and second lower electrodes in the shape of a plate.

The light source in the shape of a plate provided between the first and second lower electrodes includes a first plate light source radiating light onto the photoconductive layer and a second plate light source radiating light onto the second photoconductive layer.

The lower electrode includes a first lower electrode contacting the photoconductive layer and a second lower electrode contacting the second photoconductive layer and insulated from the first lower electrode, and the magnet includes a first magnet provided above the emitter holder, a second magnet provided below the second emitter holder, and a third magnet provided between the first and second lower electrodes. Here, the conductive layer converting unit radiates light onto the photoconductive layer and the second photoconductive layer. The conductive layer converting unit includes a first light source provided proximal to and above the charged particle emitting unit and a second light source provided proximal to and below the second charged particle emitting unit, a first light source provided at the emitter holder and surrounding the emitter and a second light source provided at the second emitter holder and surrounding the second emitter, a first light source provided at the emitter holder but separated from the emitter and a second light source provided at the second emitter holder but separated from the second emitter, or a first light source provided between the first lower electrode and the third magnet, for radiating light onto the photoconductive layer, and a second light source provided between the second lower electrode and the third magnet, for radiating light onto the second photoconductive layer.

To achieve the second object of the invention, there is provided an information writing method using the above high-density information storage apparatus. The information writing method includes a first step of adjusting the distance between the recording medium and a charged particle emitting area of the charged particle emitting unit, and a second step of injecting charged particles into the recording medium, thereby forming a conductive region corresponding to predetermined data in the recording medium.

It is preferable that the charged particles are injected under the influence of a magnetic field to prevent the charged particles from being lost while the charged particles emitted from the charged particle emitting area is travelling to a predetermined region of the recording medium directly below the charged particle emitting area. Here, the magnetic field is induced using a first magnet provided above the charged particle emitting unit and a second magnet provided below the lower electrode or using an electromagnet surrounding at least the recording medium and the charged particle emitting area.

The intensity of the magnetic field is adjusted by adjusting current flow through the electromagnet so that the charged particles emitted from the charged particle emitting area can reach the predetermined region of the recording medium directly below the charged particle emitting area even when the initial distance between the recording medium and the charged particle emitting area changes.

To achieve the second object of the invention, there is provided an information reading method using the above high-density information storage, apparatus. The information writing method includes a first step of adjusting the distance between the recording medium and a charged particle emitting area of the charged particle emitting unit, and a second step of reading data from the recording medium by recognizing charged particles emitted from the recording medium while moving the charged particle emitting area above the recording medium.

The charged particles are emitted from the recording medium under the influence of a magnetic field having a predetermined intensity so that the charged particles are not lost until they reach the charged particle emitting area disposed directly above. Here, it is preferable that the magnetic field is the same as that in the information writing method.

The intensity of the magnetic field is adjusted by adjusting current flow through the electromagnet so that the charged particles emitted from the recording medium can reach the charged particle emitting area of the charged particle emitting unit directly above the recording medium even when the distance between the recording medium and the charged particle emitting area changes.

To achieve the second object of the invention, there is provided an information erasing method using the above high-density information storage apparatus. In one embodiment, the information erasing method includes a first step of grounding the lower electrode, and a second step of discharging charged particles injected into the recording medium through lower electrode by converting the photoconductive layer into a conductive layer, thereby erasing data from the recording medium.

The second step discharges the charged particles injected into a predetermined region of the recording medium contacting the photoconductive layer through the lower electrode by selectively converting a predetermined region of the photoconductive layer into a conductive layer, thereby selectively and partially erasing data from the recording medium.

In another embodiment, the information erasing method includes a first step of grounding the lower electrode, and a second step of discharging all charged particles injected into the recording medium through lower electrode by converting the entire photoconductive layer into a conductive layer, thereby entirely erasing all data from the recording medium.

By using such a high-density information storage apparatus according to the present invention, a conventional problem of a damaged tip is avoided, and information processing speed during write, read and erasing operations is increased. In addition, since charged particles such as electrons are used for information processing, the information storage density of a recording medium can be increased compared to a conventional apparatus using a laser or probe.

BRIEF DESCRIPTION OF THE DRAWINGS

The above objects and advantages of the present invention will become more apparent by describing in detail preferred embodiments thereof with reference to the attached drawings in which:

FIG. 14 is a diagram for explaining a method of erasing information using the high-density information storage apparatus of FIG. 2.

DETAILED DESCRIPTION OF THE INVENTION

Hereinafter, a high-density information storage apparatus using electron emission and methods of writing, reading and erasing information using the apparatus will be described by explaining embodiments of the present invention with reference to the attached drawings. In drawings, the thicknesses of layers or regions are exaggerated for clarity.

First, a high-density information storage apparatus will be described with reference to FIG. 2.

<First Embodiment>

Figure 1:
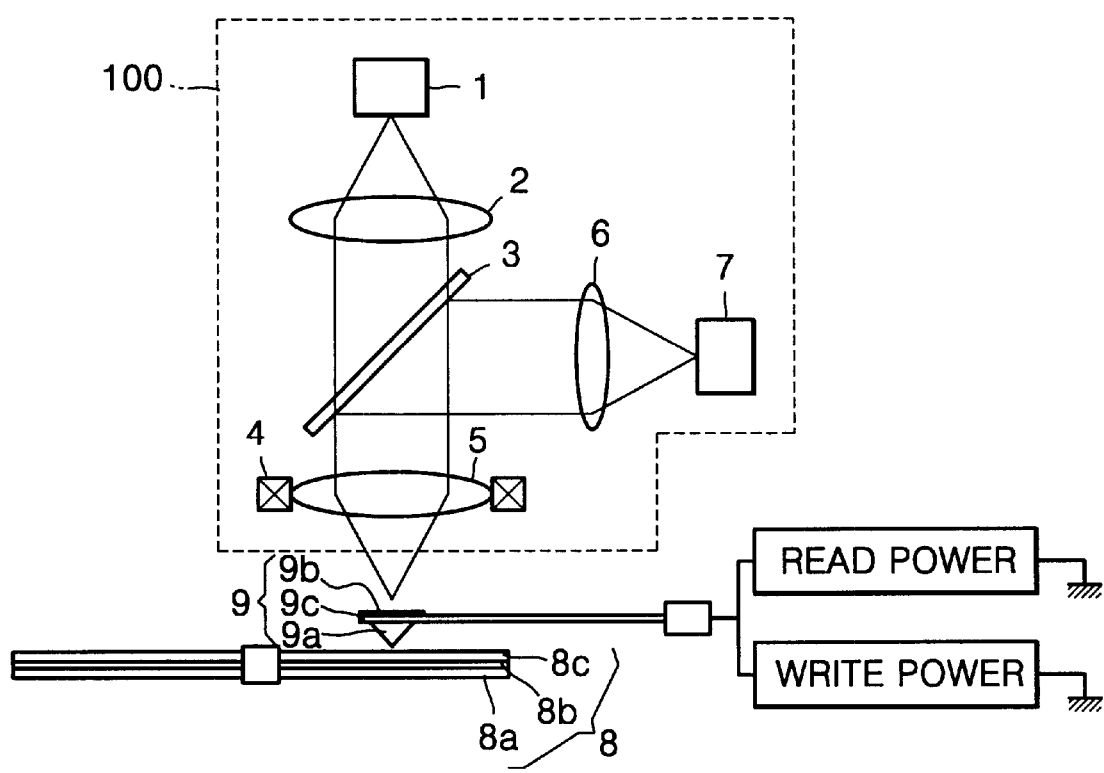
FIG. 1 is a schematic diagram of a disc apparatus using a conventional scanning probe microscope (SPM) probe.
Figure 2:
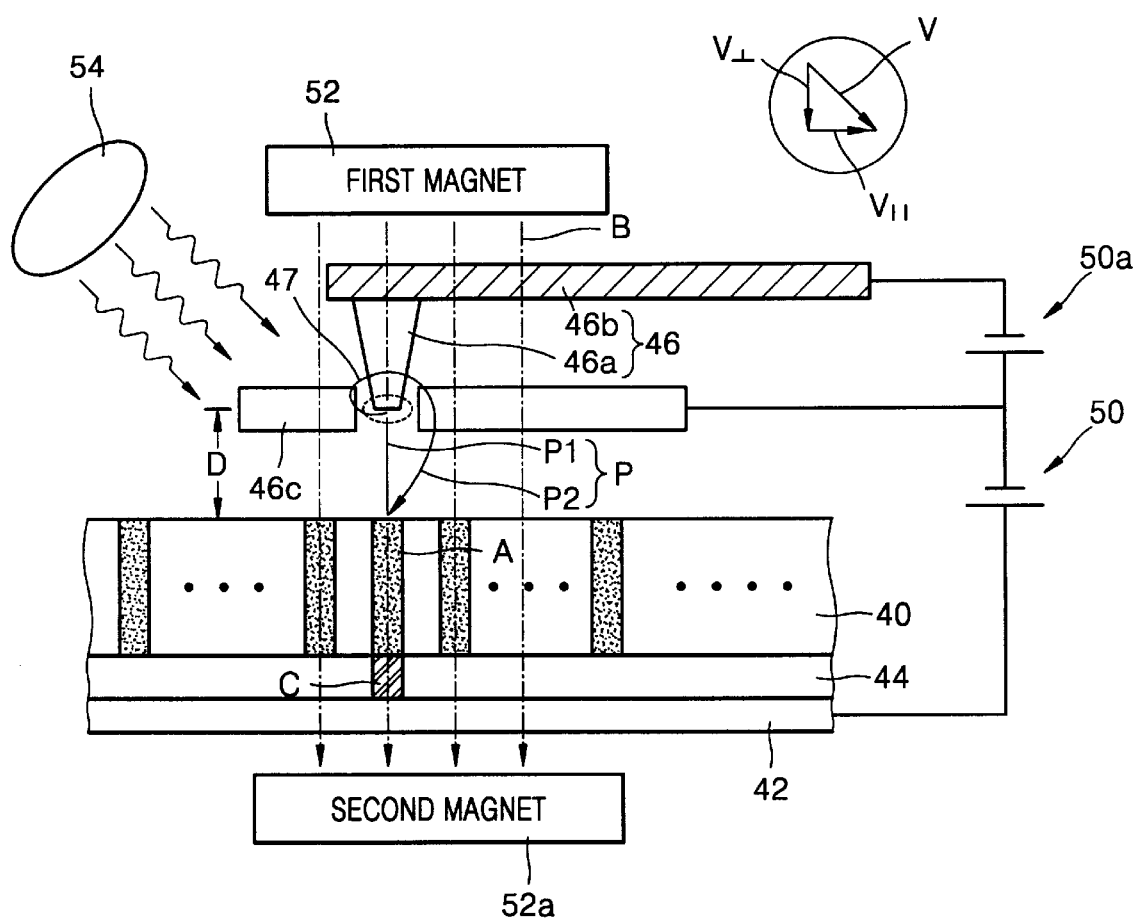
FIG. 2 is a sectional view of a high-density information storage apparatus using electron emission according to a first embodiment of the present invention.

In FIG. 2, reference numeral 40 denotes a recording medium for recording information. The recording medium 40 is provided on a lower electrode 42. A material layer (hereinafter referred to as a photoconductive layer) 44, the conductivity of which depends on the amount of light radiated thereon, is provided between the lower electrode 42 and the recording medium 40. In other words, the photoconductive layer 44 conducts when light is radiated on it and acts as a dielectric when light is not radiated on it. The top of the photoconductive layer 44 contacts the bottom of the recording medium 40, and the bottom of the photoconductive layer 44 contacts the top of the electrode 42. The photoconductive layer 44 is a material layer, for example, a dielectric layer or an isolation layer, having electrical conductivity that varies with the amount of light radiated on it. A portion of the photoconductive layer 44 on which light is radiated becomes a conductive region. It will be preferable that the photoconductive layer 44 is as thin as possible to realize a small and light apparatus. However, if the photoconductive layer 44 is excessively thin, it becomes too sensitive to light to serve its intended purpose. Accordingly, it is preferable to determine an optimal thickness for the photoconductive layer 44 taking into account all factors described above. The recording medium 40 itself is also a nonconductor such as a dielectric layer. However, when charged particles are injected into the recording medium 40, a portion of the recording medium having the charged particles becomes conductive. The charges particles may be any particles having charge, but taking into account a need for high information recording density and ease of manufacturing the charged particles are preferably electrons. Reference character A in the recording medium 40 denotes a portion into which charged particles are injected, that is, a conductive region A in the recording medium 40. The width of the conductive region A may be uniform throughout the recording medium 40 or different by areas of the recording medium 40 depending on the information to be stored.

Figure 9:
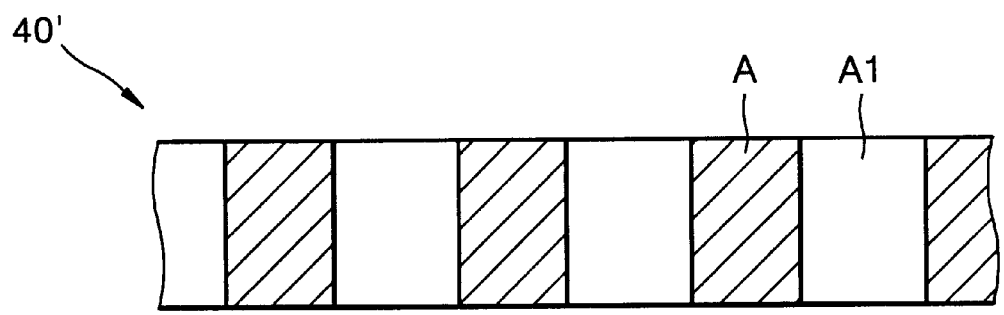
FIG. 9 is a sectional view of an example of the distribution of conductive regions and dielectric regions which may be included in the high-density information storage apparatus of FIG. 2.
Figure 10:
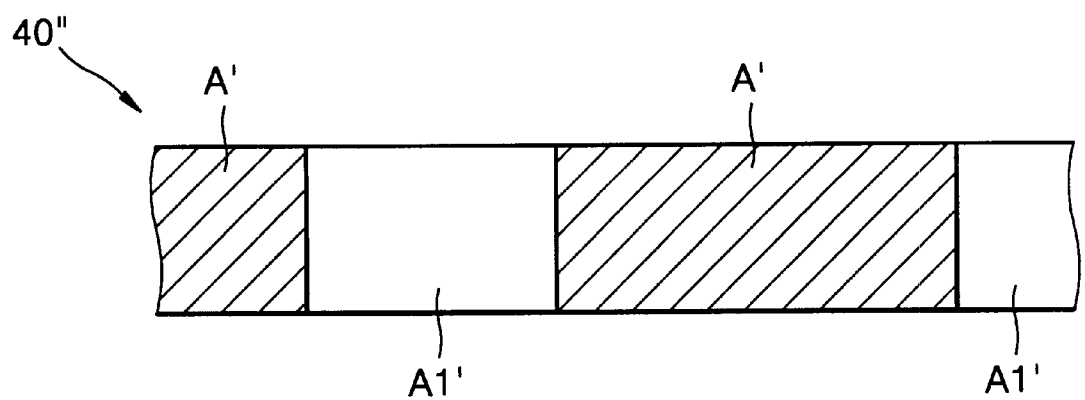
FIG. 10 is a sectional view of another example of the distribution of conductive regions and dielectric regions which may be included in the high-density information storage apparatus of FIG. 2.

For example, assuming that data "1" is recorded in a conductive region A and data "0" is recorded in a region into which charged particles are not injected between conductive regions A, if the configuration of information recorded to the recording medium 40 shows "1's" and "0's" which are regularly repeated, such as "10101010 . . . ", the distribution of conductive regions A and dielectric regions A1 in a recording medium 40' is uniform, as shown in FIG. 9. However, if the configuration of information recorded to the recording medium 40 shows "1's" and "0's" which are irregularly or randomly repeated, such as "1001110 . . . ", the size of a conductive region A' is different from that of a dielectric region A1', and their distribution in a recording medium 40" is not uniform, as shown in FIG. 10.

Again referring to FIG. 2, a charged particle emitting unit 46 is provided at a predetermined distance above the recording medium 40. The charged particle emitting unit 46 includes an emitter 46a for emitting charged particles and an emitter holder 46b for supporting the emitter 46a and allowing the emitter 46a to move up, down, to the left and to the right. The emitter 46a is installed at the emitter holder 46b so that a tip area 47 from which charged particles are immediately emitted faces the recording medium 40. Depending on the type of charged particles generated, the shape of the charged particle emitting unit 46 of FIG. 2 may be modified. Since it is preferable that a voltage applied to the emitter 46a and necessary for causing emission of charged particles is as low as possible, the emitter 46a is preferably formed of a material having a low work function with respect to a charged particle, for example, an electron.

A gate 46c is provided between the charged particle emitting unit 46 and the recording medium 40. The gate 46c is provided around the tip area 47 of the emitter 46b. A first power supply 50 is connected between the gate 46c and the lower electrode 42, and a second power supply 50a is connected between the charged particle emitting unit 46 and the gate 46c. The second power supply 50a is for allowing the charged particle emitting unit 46 to emit charged particles, so it is preferable that the level of voltage from the second power supply 50a is high enough to impart an energy that is greater than the electron work function of a material forming the emitter 46a to the electrons. Charged particles, for example, electrons are emitted from the emitter 46a by the second power supply 50a. Among the emitted charged particles, charged particles that are greatly deviated from the tip area 47 of the emitter 46a are absorbed to the gate 46c surrounding the tip area 47 to be blocked. As a result, among the charged particles emitted from the emitter 46a, only charged particles emitted vertically downward and only charged particles that are not greatly deviated from the emitter 46a move toward the recording medium 40. Since the gate 46c surrounds the tip area 47 of the emitter 46a, and the first power supply 50 is connected between the gate 46c and the lower electrode 42, a parallel electric field is formed between the tip area 47 and a conductive region A of the recording medium 40 directly below the tip area 47. Accordingly, charged particles emitted straight down directly from the tip area 47 of the emitter 46a immediately move toward the conductive region A of the recording medium 40.

Of the charged particles P emitted from the emitter 46a, some charged particles P1 are emitted straight down directly from the tip area 47 of the emitter 46a and some charged particles P2 are emitted to be deviated a little from the tip area 47. In order to increase the use efficiency of the charged particles, it is preferable to allow the charged particles P2 as well as the charged particles P1 to reach the predetermined region of the recording medium 40 directly below the tip area 47 of the emitter 46a. To realize this, first and second magnets 52 and 52a are provided around the lower electrode 42 and the charged particle emitting unit 46 to direct the charged particles. In other words, the first magnet 52 is provided above the charged particle emitting unit 46, and the second magnet 52a is provided below the lower electrode 42. For the first and second magnets 52 and 52a, any magnets which can form a uniform magnetic field directing from the charged particle emitting unit 46 (the lower electrode 42) to the lower electrode 42 (the charged particle emitting unit 46) between the charged particle emitting unit 46 and the lower electrode 42 can be used. However, as described below, it is preferable that electromagnets, not permanent magnets, are used for the first and second magnets 52 and 52a. More specifically, if the first and second magnets 52 and 52a are realized as a single bipolar permanent magnet or two monopolar permanent magnets surrounding the lower electrode 42 and the charged particle emitting unit 46, the intensity of the magnetic field between the charged particle emitting unit 46 and the tip area 47 of the emitter 46a is fixed to a predetermined value.

Due to the permanent magnet, the charged particles P2 move in the magnetic field having a predetermined intensity at a velocity v which is comprised of a parallel component $v_\parallel$ and a perpendicular component $v_\perp$ with respect to the recording medium 40, as shown in the circle inset of FIG. 2. The charged particles P2 moving in the magnetic field have a velocity equal to a velocity component perpendicular to the magnetic field, that is, a velocity component parallel to the recording medium 40 so that the charged particles P2 emitted from an incident point feel a force described by Equation 1 and move in a circular path having a radius r. Here, the radius r is determined according to Equation (2).

$$F = qv_\parallel \times B \qquad (1)$$

Here, F and B are vectors and denote force applied to a charged particle and a magnetic field, respectively, q denotes the charge of the charged particle, $v_\parallel$ denotes the parallel component of velocity with respect to the recording medium 40 but perpendicular with respect to the magnetic field.

$$r = \frac{mv_\parallel}{qB} \qquad (2)$$

Here, m denotes the mass of a charged particle.

Since the mass m and charge q of a charged particle are constant, the radius r of the charged particle moving in the magnetic field is determined by the magnetic field B and the parallel component $v_\parallel$ of the velocity v of the charged particle. When both the parallel component $v_\parallel$ of velocity and the intensity of the magnetic field B are constant, the charged particle moves in a circular path with a radius r determined according to Equation 2 starting from an incident point within the magnetic field B, as described above.

The relationship between the angular velocity ω and the frequency f of the charged particle moving within the magnetic field B is expressed by Equation (3). Since period T is inversely proportional to the frequency f (T=1/f), the relationship between the period T and the frequency f is expressed by Equation (4).

$$\omega = 2\pi f = \frac{qB}{m} \qquad (3)$$

$$T = \frac{1}{f} = \frac{qB}{2\pi m} \qquad (4)$$

Since the lower electrode 42 and the emitter 46a are connected to the power supply 50, a potential difference is formed therebetween. Charged particles that do not directly move up or down from their emitted points have a non-zero parallel component $v_{\parallel}$ of velocity and a perpendicular component $v_{\perp}$ of velocity with respect to the recording medium 40, as described above. The velocity component $v_{\parallel}$ and magnetic field B cause the charged particles to move in a circular path with a period T given by Equation (4) and a radius r given by Equation (2). Since it is parallel to the magnetic field B, the velocity component $v_{\perp}$ does cause the charged particles to move in a circular path, instead causing the charged particles to move only rectilinearly in a direction perpendicular to the recording medium 40.

Figure 11:
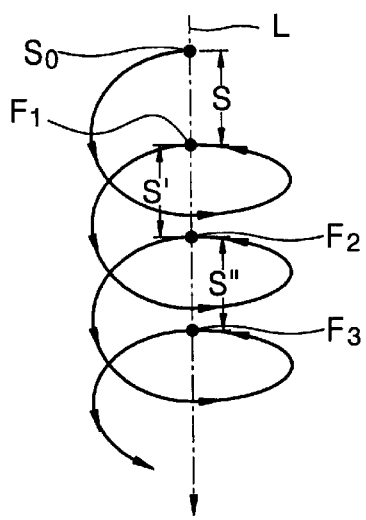
FIG. 11 is a diagram of the spiral track of a charged particle emitted during a process of writing or reading information in the high-density information storage apparatus of FIG. 2.

Therefore, the emitted charged particles moves in a spiral path from the tip area 47 of the emitter 46a toward the recording medium 40 or from a region of the recording medium 40 to which information is written toward the tip area 47, the spiral path having a radius r according to Equation (2) and a period T according to Equation (4), as shown in FIG. 11. In FIG. 11, reference $S_0$ denotes a charged particle emission point, i.e., the tip area 47 of the emitter 46a or a region of the recording medium 40 to which information is written. References $F_1$, $F_2$ and $F_3$ denote first through third points which a charged particle emitted from the emission point $S_0$ passes by signifying the completion of one, two and three periods 1T, 2T and 3T, respectively. Since the charged particle has a perpendicular component $v_{\perp}$ of velocity with respect to the recording medium 40, the first through third points $F_1$, $F_2$ and $F_3$ are on the same axis L at different positions. A velocity at which a charged particle moves along the axis L, that is, a velocity at which a charged particle moves in a direction perpendicular to the recording medium 40, is the perpendicular component $v_{\perp}$ of velocity of the charged particle with respect to the surface of the recording medium 40. So the distance S' between the first and second points $F_1$ and $F_2$ or the distance S" between the second and third points $F_2$ and $F_3$ can be obtained from Equation (5).

$$S = v_{\perp} t = \frac{qE}{m} t^2 \qquad (5)$$

In Equation (5), S is the distance that a charged particle moves in a predetermined time t, and E is the magnitude of the electric field between the tip area 47 and a conductive region A of the recording medium 40. Accordingly, the distance S between the charged particle-emission point $S_0$ and the first point $F_1$ or the distance S' or S" between adjacent points can be calculated by substituting a period of 1T for the time t in Equation (5). The distance S+S' between the charged particle-emission point $S_0$ and the second point $F_2$ and the distance S+S'+S" between the charged particle-emission point $S_0$ and the third point $F_3$ can be calculated by substituting periods of 2T and 3T, respectively, for the time t in Equation (5).

Since the period T is given by Equation (4), the distance S between the charged particle-emission point $S_0$ and the first point $F_1$ or the distance S' or S" between adjacent points is expressed by Equation (6).

$$S = \frac{qE}{m}\left(\frac{2\pi m}{qB}\right)^2 = 4\pi^2 \frac{mE}{qB^2} \qquad (6)$$

Among the emitted charge particles, charged particles that are not absorbed to the gate 46c and are not emitted straight down directly from the tip area 47 spiral from the emission point $S_0$ and reach a conductive region A of the recording medium 40 due to the magnetic field B induced by the first and second magnets 52 and 52a and the electric field E between the tip area 47 and the conductive region A of the recording medium 40. The intensity of the magnetic field B is constant when the first and second magnets 52 and 52a are permanent magnets. Accordingly, in order to increase the efficiency of the charged particle, the distance D between the emitter 46a and a predetermined region of the recording medium 40 directly below the emitter 46a is preferably expressed by Equation (6) or integer multiples of S in Equation (6). In other words, it is preferable that the distance D between the emitter 46a and the recording medium 40 directly below the emitter 46a is a distance (a first distance) for which a charged particle P2 emitted from the tip area 47 of the emitter 46a completes one full revolution (or one period 1T).

Meanwhile, when the first and second magnets 52 and 52a are realized as a single bipolar electromagnet or two monopolar electromagnets, the intensity of the magnetic field B between the charged particle emitting unit 46 and the lower electrode 42 can be adjusted by controlling current flowing through the electromagnets. Accordingly, when the first and second magnets 52 and 52a are electromagnets, even if the distance D between the emitter 46a and a predetermined region of the recording medium 40 directly below the emitter 46a changes, a charged particle emitted from the emitter 46a can be injected into the predetermined region of the recording medium 40 directly below the emitter 46a by adjusting the intensity of the magnetic field B. In addition, it is possible to allow a charged particle emitted from a region of the recording medium, to which information has been written, to reach the emitter 46a positioned directly above the region, and preferably, to reach the tip area 47, during reproduction of the information.

As described above, it does not matter if the photoconductive layer 44 provided between the recording medium 40 and the lower electrode 42 is nonconductive when charged particles are injected into the recording medium 40. In other words, the photoconductive layer 44 may be made to be conductive or may be maintained nonconductive. However, when charged particles injected into the recording medium 40 are to be emitted toward the emitter 46a, voltage should be applied to a conductive region A of the recording medium 40 into which the charged particles are injected. Accordingly, at least a predetermined region C of the photoconductive layer 44 directly below the conductive region A of the recording medium 40 should be converted into a conductive region.

When information written to the recording medium 40 is to be erased, that is, when charged particles injected into the recording medium 40 are removed, it is preferable to remove the charged particles from the recording medium 40 through the photoconductive layer 44 under a state in which the lower electrode 42 is grounded. Here, the entire photoconductive layer 44 should be converted into a conductive region. Accordingly, a separate conductive layer conversion unit for converting the photoconductive layer 44 into a conductive layer is required. For this, a light radiating unit 54 for radiating light onto a selected partial region of the photoconductive layer 44 or on the entire photoconductive layer 44 is provided to convert part of the photoconductive layer 44 or the entire photoconductive layer 44 into a conductive region. The light radiating unit 54 is provided proximal to the charged particle emitting unit 46 above the recording medium 40 so that light can be incident at an oblique angle to the photoconductive layer 44 through the recording medium 40. It is preferable to closely connect the operation of the light radiating unit 54 with the operation of the charged particle emitting unit 46, and more preferably, with the operation of the emitter 46a, in order to selectively radiate light onto a predetermined region of the photoconductive layer 44.

Although not shown in the drawings, a light radiating unit may be provided at the emitter holder 46b either surrounding the emitter 46a or separated from the emitter 46a. Alternatively, a light radiating unit may be provided in the form of a conductive plate between the lower electrode 42 and the photoconductive layer 44. The photoconductive layer 44 may be a substrate with a plurality of semiconductor devices having a switching function. In this case, a light radiating unit is not necessary, thereby realizing a much smaller apparatus.

<Second Embodiment>

It is premised that the same reference numerals denote the same members in the first and second embodiments, so their descriptions will be omitted.

Figure 3:
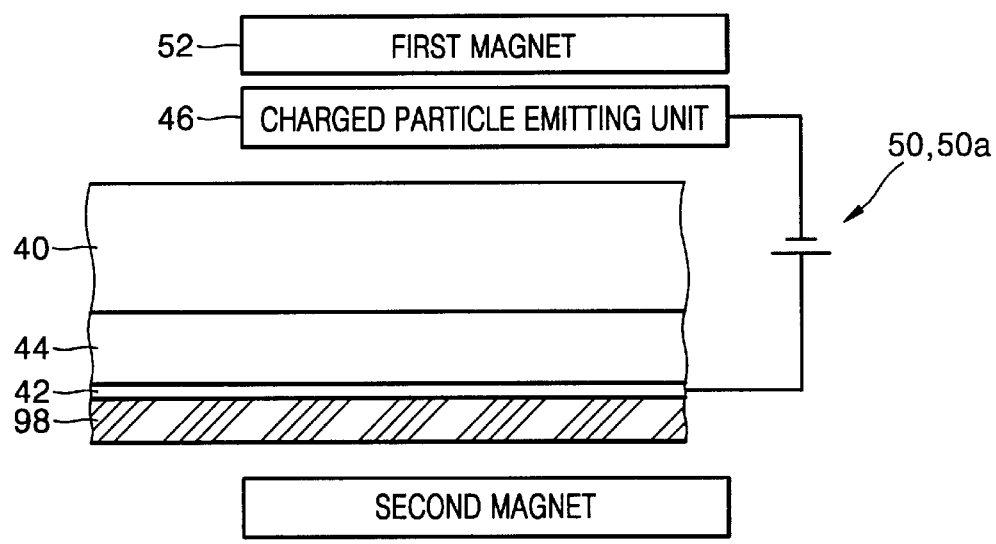
FIGS. 3 through 8 are schematic sectional views of high-density information storage apparatuses using electron emission according to second through seventh embodiments of the present invention.

As shown in FIG. 3, an information storage apparatus according to the second embodiment has a light radiating unit 98 at the bottom of a lower electrode 42 instead of at the top of the recording medium 40, as in FIG. 2. The light radiating unit 98 is preferably provided so that it can radiate light onto a predetermined selected region or entire region of a photoconductive layer 44 through the lower electrode 42. Accordingly, it is preferable that the light radiating unit 98 is realized as a plate-shaped light source contacting the entire bottom of the lower electrode 42. Here, the lower electrode 42 is preferably a transmissive electrode.

<Third embodiment>

Figure 4:
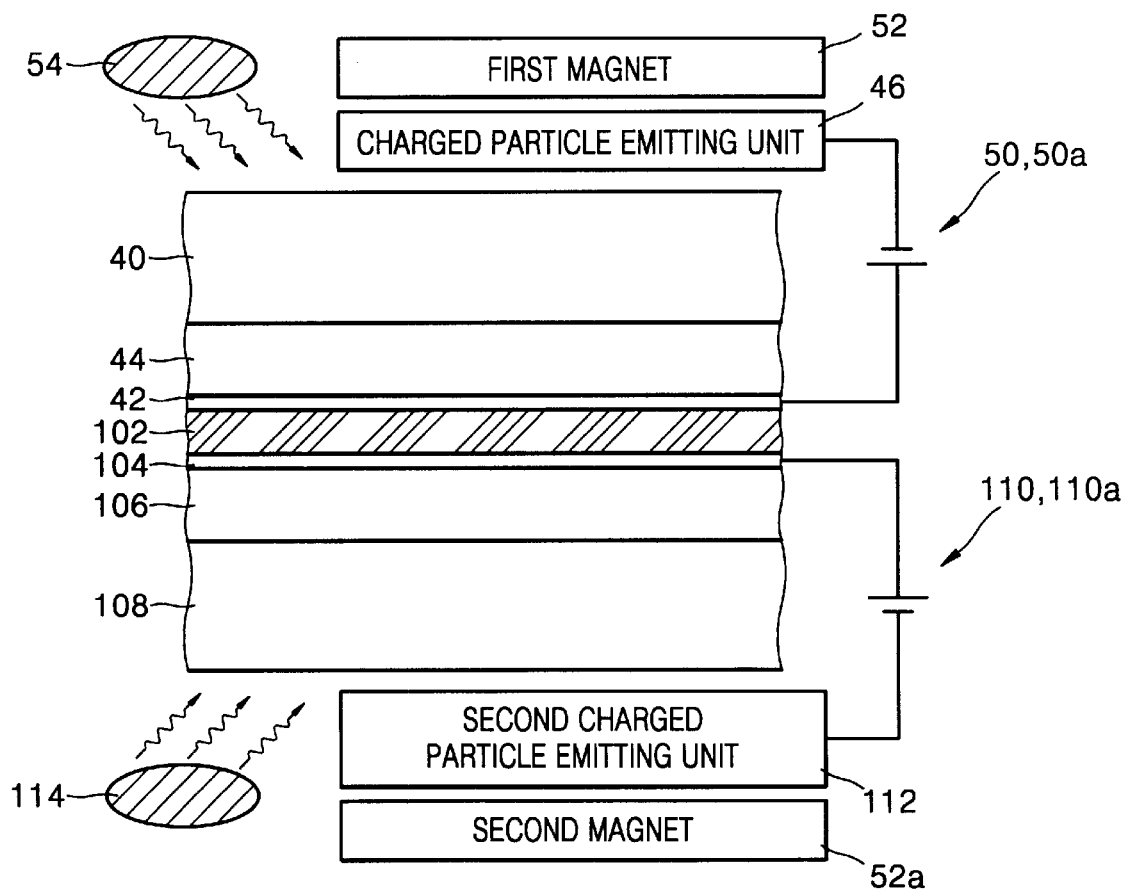

The third embodiment will be described with the same premise as the second embodiment. As shown in FIG. 4, an information storage apparatus according to the third embodiment is characterized by a double recording medium provided at upper and lower portions.

More specifically, a lower electrode 42, a photoconductive layer 44 and a recording medium 40 are sequentially formed at the top of an insulation layer 102, and a second lower electrode 104, a second photoconductive layer 106 and a second recording medium 108 are sequentially formed at the bottom of the insulation layer 102. The second lower electrode 104, the second photoconductive layer 106 and the second recording medium 108 are preferably the same as the lower electrode 42, the photoconductive layer 44 and the recording medium 40, respectively. A second charged particle emitting unit 112 is provided under the second recording medium 108. The second charged particle emitting unit 112 is connected to the second lower electrode 104 through third and fourth power supplies 110 and 110a which apply a predetermined voltage to the second lower electrode 104 and the second charged particle emitting unit 112 to cause emission of charged particles. For convenience sake, the third and fourth power supplies 110 and 110a are illustrated as a single power supply. The third and fourth power supplies 110 and 110a have the same arrangement and function as the first and second power supplies 50 and 50a shown in FIG. 2. In other words, the third power supply 110 corresponds to the first power supply 50a. The fourth power supply 110a is connected between a gate (not shown) included in the second charged particle emitting unit 112 and an emitter holder (not shown) and corresponds to the second power supply 50a. The structure and function of the second charged particle emitting unit 112 are preferably the same as those of a charged particle emitting unit 46 provided above the recording medium 40. Accordingly, although not shown in the drawings, the second charged particle emitting unit 112 includes a second emitter with a tip area facing the second recording medium 108, and a second emitter holder. Preferably, the second emitter and the second emitter holder are the same as the emitter 46a and the emitter holder 46b, respectively, of the charged particle emitting unit 46 of FIG. 2. However, the second charged particle emitting unit 112 may be different from the charged particle emitting unit 46. In this case, the second emitter and second emitter holder may be different from the emitter 46a and the emitter holder 46b, respectively. In addition, a second gate (not shown) performing the same function as the gate 46c shown in FIG. 2 is provided between the second charged particle emitting unit 112 and the second recording medium 108. These facts are also applied to other embodiments to be described below, and thus descriptions thereof will be omitted.

A second light radiating unit 114 is provided below the second recording medium 108. The second light radiating unit 114 radiates light on the second photoconductive layer 106 in close connection with the operation of the second charged particle emitting unit 112 in order to convert a predetermined selected region or the entire region of the second photoconductive layer 106 into a conductive region when data is written to the second recording medium 108 and when data is read or erased from the second recording medium 108, that is, when charged particles injected into the second recording medium 108 are discharged. The second light radiating unit 114 is preferably the same as the light radiating unit 54 provided above the recording medium 40 for the same purpose. However, since the amount or intensity of light necessary for converting the photoconductive layer 42 into a conductive layer can be different from that necessary for converting the second photoconductive layer 106 into a conductive layer depending on a voltage applied between the lower electrode 42 and the charged particle emitting unit 46 and a voltage applied between the second lower electrode 104 and the second charged particle emitting unit 112, the light radiating unit 54 may be different from the second light radiating unit 114. In other words, the amount or intensity of light radiated by the second light radiating unit 114 may be different from that radiated by the light radiating unit 54.

A second magnet 52a corresponding to a first magnet 52 is provided below the second charged particle emitting unit 114. The first and second magnets 52 and 52a are used as a data loss preventing unit for preventing data from being lost by preventing charged particles from being lost while data is written to or read from the recording medium 40 or the second recording medium 108, and they are preferably integrated with the charged particle emitting unit 46 and the second charged particle emitting unit 112, respectively. In addition, the first and second magnets 52 and 52 are preferably provided to correspond to the respective entire surfaces of the recording medium 40 or the second recording medium 108 so that emitted charged particles can reach a position directly below or above a place from which they are emitted regardless of regions at which the charged particle emitting unit 46 and the second charged particle emitting unit 112 are positioned on the recording medium 40 or the second recording medium 108, respectively.

<Fourth Embodiment>

Figure 5:
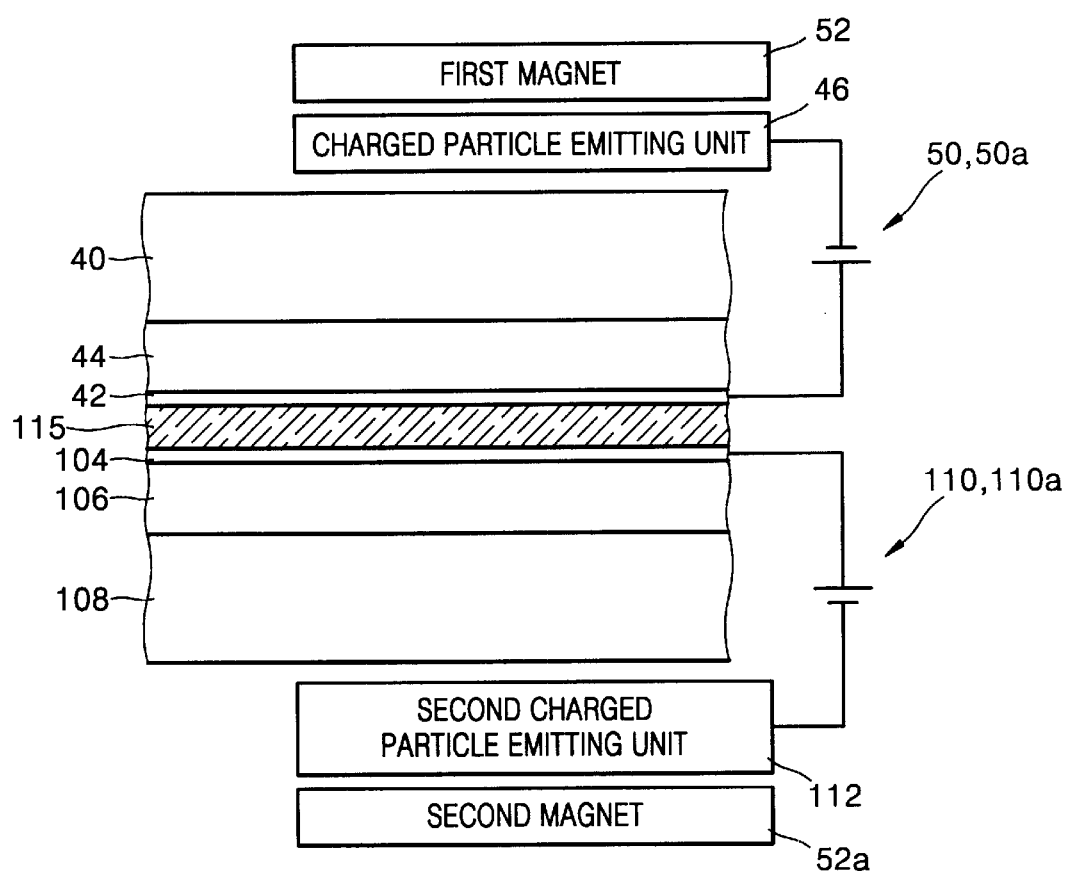

In the first through fourth embodiments, the same reference numerals denote the same members, so their descriptions will be omitted. Referring to FIG. 5, like the third embodiment, an information storage apparatus according to the fourth embodiment includes a double recording medium and a double lower electrode at the upper and lower portions. However, unlike the third embodiment which has separate light radiating units above the recording medium 40 and below the second recording medium 108, a light radiating unit 115 is provided between a lower electrode 42 and a second lower electrode 104. The light radiating unit 115 is a light source which radiates light on a photoconductive layer 44 and a second photoconductive layer 106 through the lower electrode 42 and the second lower electrode 104, respectively, to convert a predetermined selected region or entire region of each of the photoconductive layer 44 and the second photoconductive layer 106 into a conductive layer. Preferably, the light radiating unit 115 is a plate-shaped light source.

<Fifth Embodiment>

Figure 6:
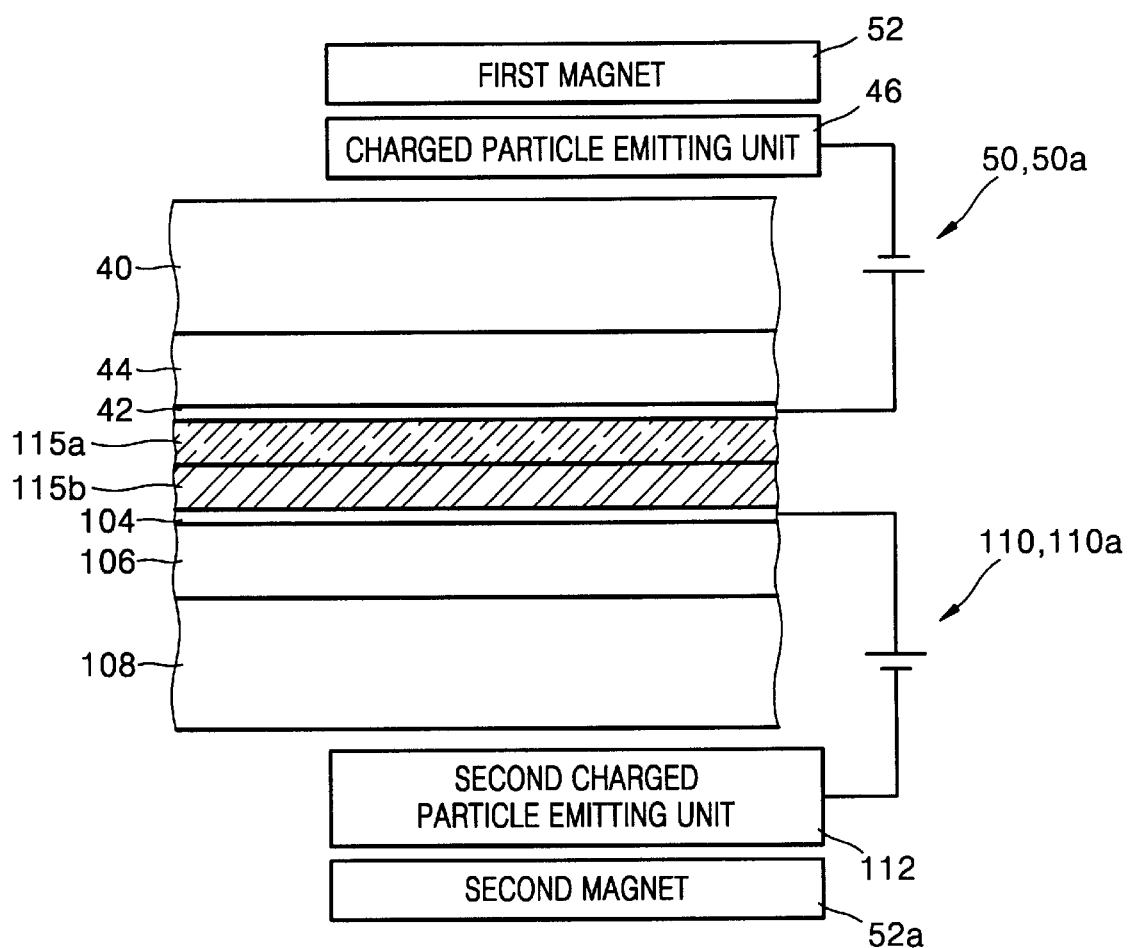

In the fourth and fifth embodiments, the same reference numerals denote the An same members, so their descriptions will be omitted. Referring to FIG. 6, third and fourth light radiating units 115a and 115b are provided between a lower electrode 42 and a second lower electrode 104. The third light radiating unit 115a is a light source for radiating light onto a photoconductive layer 44 through the lower electrode 42 while data is read from or written to the recording medium 40. Preferably, the third light radiating unit 115a is plate-shaped. The fourth light radiating unit 115b is a light source for radiating light onto a second photoconductive layer 106 through the second lower electrode 104 for the same purpose as the third light radiating unit 115a. Preferably, the fourth light radiating unit 115b is plate-shaped. Here, it is preferable that the third and fourth light radiating units 115a and 115b are the same light sources; however they may be different light sources for the same reason as stated in the description of the information storage apparatus according to the third embodiment.

<Sixth Embodiment>

In the first through sixth embodiments, the same reference numerals denote the same members, so their descriptions will be omitted. An information storage apparatus according to the sixth embodiment is characterized by a double recording medium and a double lower electrode provided at the upper and lower portions and first through third magnets used as a data loss preventing unit.

Figure 7:
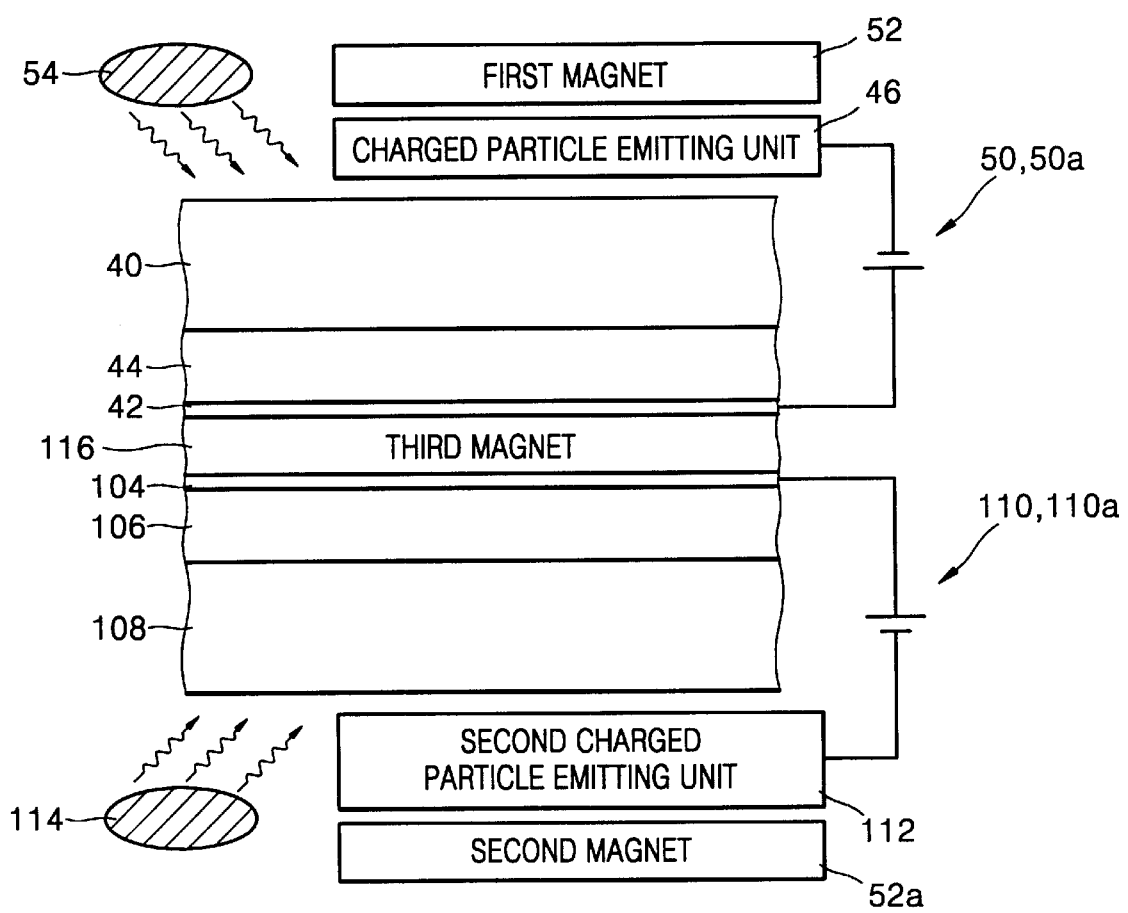

Referring to FIG. 7, a first magnet 52 is provided above a charged particle emitting unit 46. A second magnet 52a is provided below a second charge particle emitting unit 112. A third magnet 116 is provided between a lower electrode 42 and a second lower electrode 104. The third magnet 116 may be a permanent magnet. However, it is preferable that the third magnet 116 is an electromagnet in order to readily respond to a change in the distance between a recording medium and a charged particle emitting unit, a data write and read unit. It is not completely impossible to prepare the first through third magnets 52, 52a and 116 using both permanent magnets and electromagnets. For example, the third magnet 116 can be realized as a plate-type permanent magnet, and the first and second magnets 52 and 52a can be realized as electromagnets. However, taking into account convenience in use and rapid response to a change in the distance described above, it is preferable that the first through third magnets 52, 52a and 116 are all electromagnets. It is preferable that the first and second magnets 52 and 52a are integrated with a charged particle emitting unit 46 and a second charged particle emitting unit 112, respectively, as stated in the description of the third embodiment. However, it may be preferable that the first and second magnets 52 and 52a are provided to correspond to the respective entire surfaces of a recording medium 40 and a second recording medium 108 so that they can correspond to the third magnet 116. Here, the sides of first through third magnets 52, 52a and 116 facing each other have opposite polarities.

A first light radiating unit 54 is provided above the recording medium 40, and a second light radiating unit 114 is provided below the second recording medium 108. When the first and second magnets 52 and 52a correspond to the respective entire surfaces of the recording medium 40 and second recording medium 108, it is preferable that the first and second light radiating units 54 and 114 are provided between the recording medium 40 and the first magnet 52 and between the second recording medium 108 and the second magnet 52a, respectively, to operate in association with the charged particle emitting unit 46 and the second charged particle emitting unit 112, respectively.

<Seventh Embodiment>

In the fifth through seventh embodiments, the same reference numerals denote the same members, so their descriptions will be omitted. An information storage apparatus according to the seventh embodiment is characterized by a double light radiating unit and a third magnet which are provided between lower electrodes disposed at the upper and lower portions in a double structure.

Figure 8:
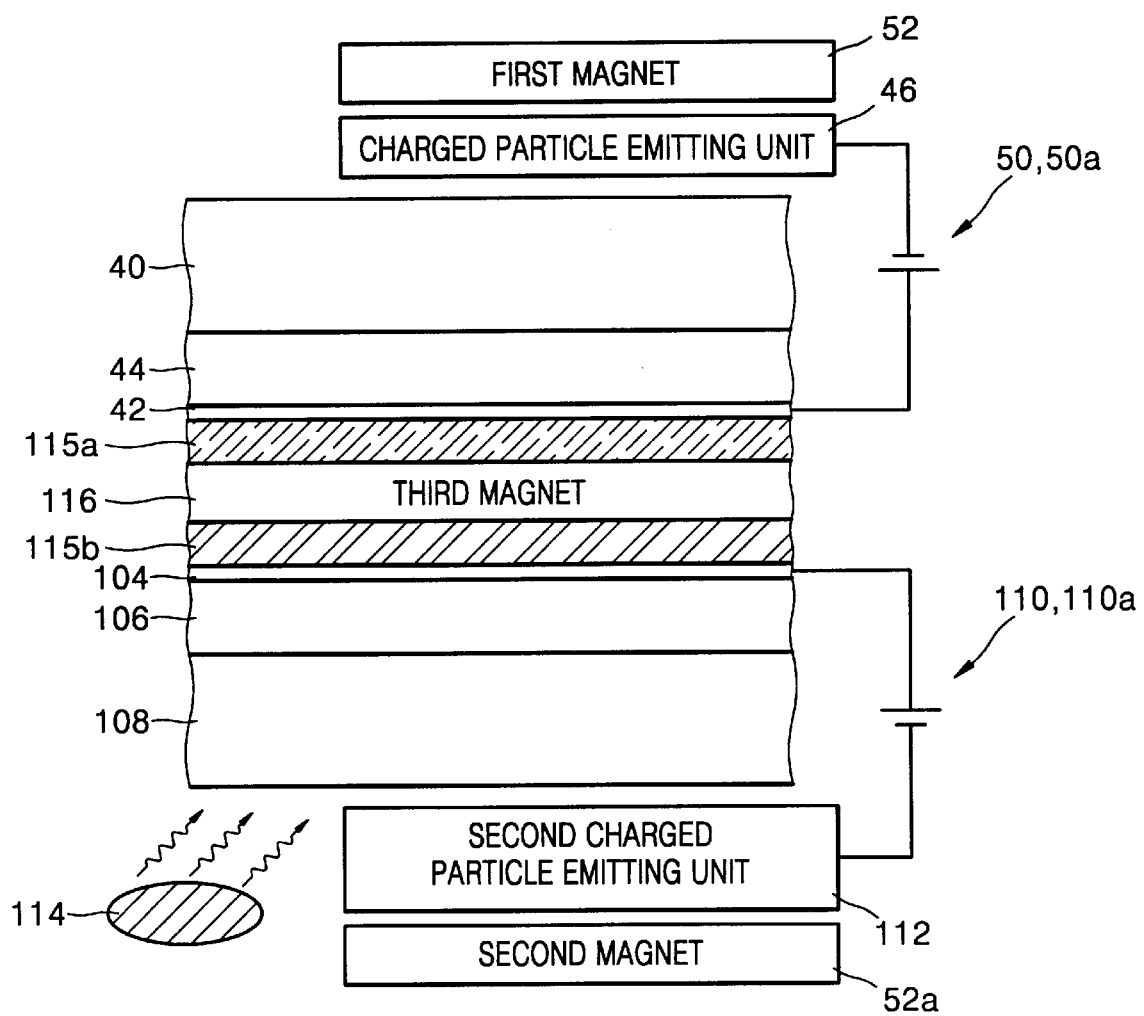

More specifically, as shown in FIG. 8, a third light radiating unit 115a is provided between a lower electrode 42 and a third magnet 116, and a fourth light radiating unit 115b is provided between a second lower electrode 104 and the third magnet 116. Separate light radiating units are not provided above a recording medium 40 and below a second recording medium 108.

The following description concerns methods of writing, reading and erasing information using an information storage apparatus according to the present invention. In the relevant drawings, the first and second magnets 52 and 52a are omitted for convenience sake, and the magnetic field B is represented by a large arrow.

<Writing>

Figure 12:
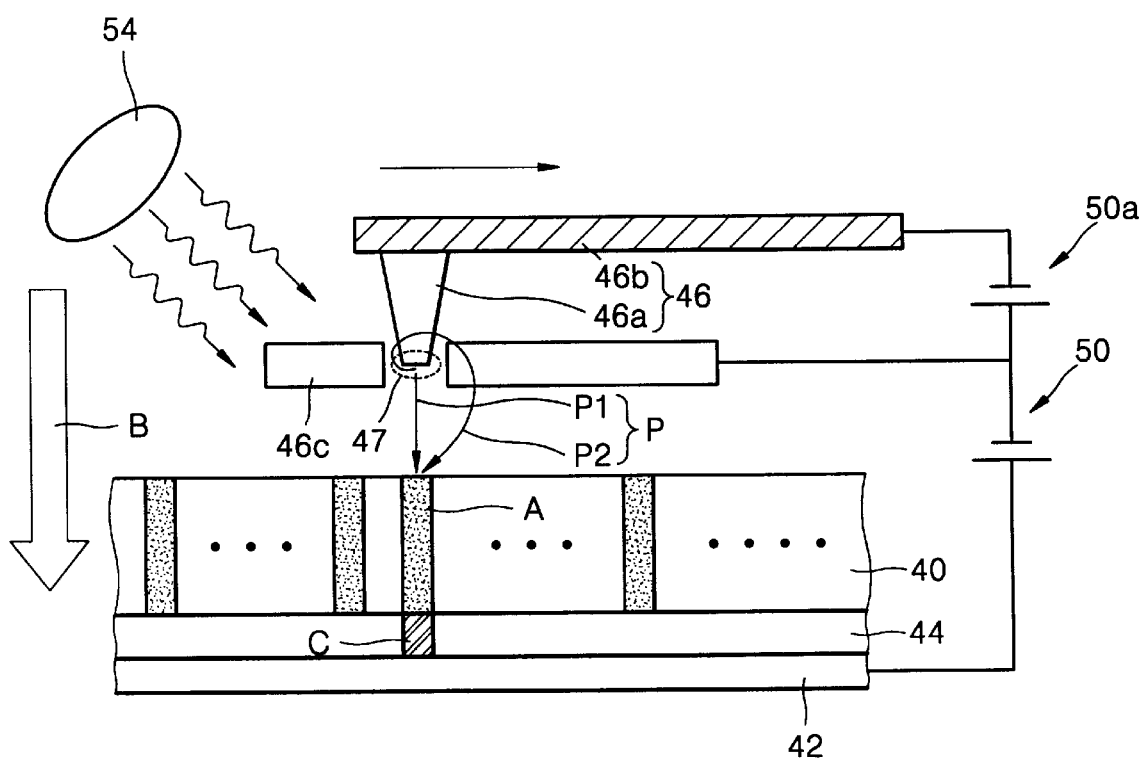
FIG. 12 is a diagram for explaining a method of writing information using the high-density information storage apparatus of FIG. 2.

Referring to FIG. 12, in order to allow charged particles P emitted from a charged particle emitting unit 46 to be injected into a recording medium 40 to satisfy the conditions described above, the distance S between the charged particle emitting unit 46 and the recording medium 40 may be adjusted when the first and second magnets 52 and 52a are permanent magnets, or the current applied to first and second magnets 52 and 52a may be adjusted to adjust the intensity of the magnetic field B formed between the charged particle emitting unit 46 and the recording medium 40. Thereafter, a predetermined voltage is applied between the charged particle emitting unit 46 and a gate 46c, thereby allowing the charged particles P to be emitted from an emitter 46a. Here, converting a part of a photoconductive layer 44 or the entire photoconductive layer 44 into a conductive region is optional. In other words, light can or cannot be radiated onto a predetermined region of the recording medium 40, into which the charged particles P are injected, using a light radiating unit 54. The emitted charged particles P are influenced by the magnetic field B and electric field. Accordingly, charged particles emitted straight down directly from a tip area 47 of the emitter 46a and charged particles that are not absorbed to the gate 46c among the charged particles that are not emitted straight down directly from the tip area 47 are all injected into the predetermined region of the recording medium 40 directly below the emitter 46a regardless of whether they move rectilinearly or not. With such an arrangement, the predetermined region is converted into a conductive region A.

The conductive region A formed in the recording medium 40 can be set to predetermined data. For example, the conductive region A can be set to data "1", and a region into which the charged particles P are not injected can be set to data "0". Here, the above procedure of injecting the charged particles is writing data "1" to the recording medium 40. In the reverse case, the above procedure of injecting the charged particles is writing data "0" to the recording medium 40.

While the emitter 46a is moving above the recording medium 40, charged particles P are injected into the recording medium 40 according to the above method, thereby writing desired information.

The amount of charged particles injected into the recording medium 40 for writing information is enough if the emitter 46a can recognize the emission of the charged particles during a read operation. Therefore, a writing time is very short compared to a conventional write operation provoking a change in the phase of a material using a laser or the like. Since a read operation which will be described below is the reverse operation of the above write operation, a reading time is also very short compared to a conventional read operation. In addition, since most charged particles as well as electrons are very small, a conductive region A formed in the recording medium 40 is very narrow. Accordingly, even if the size of the recording medium 40 is the same as a conventional one, much more information can be written to the recording medium 40.

<Reading>

Information written to a recording medium is read through a procedure of emitting injected charged particles from a conductive region of the recording medium and detecting the emitted charged particles.

Figure 13:
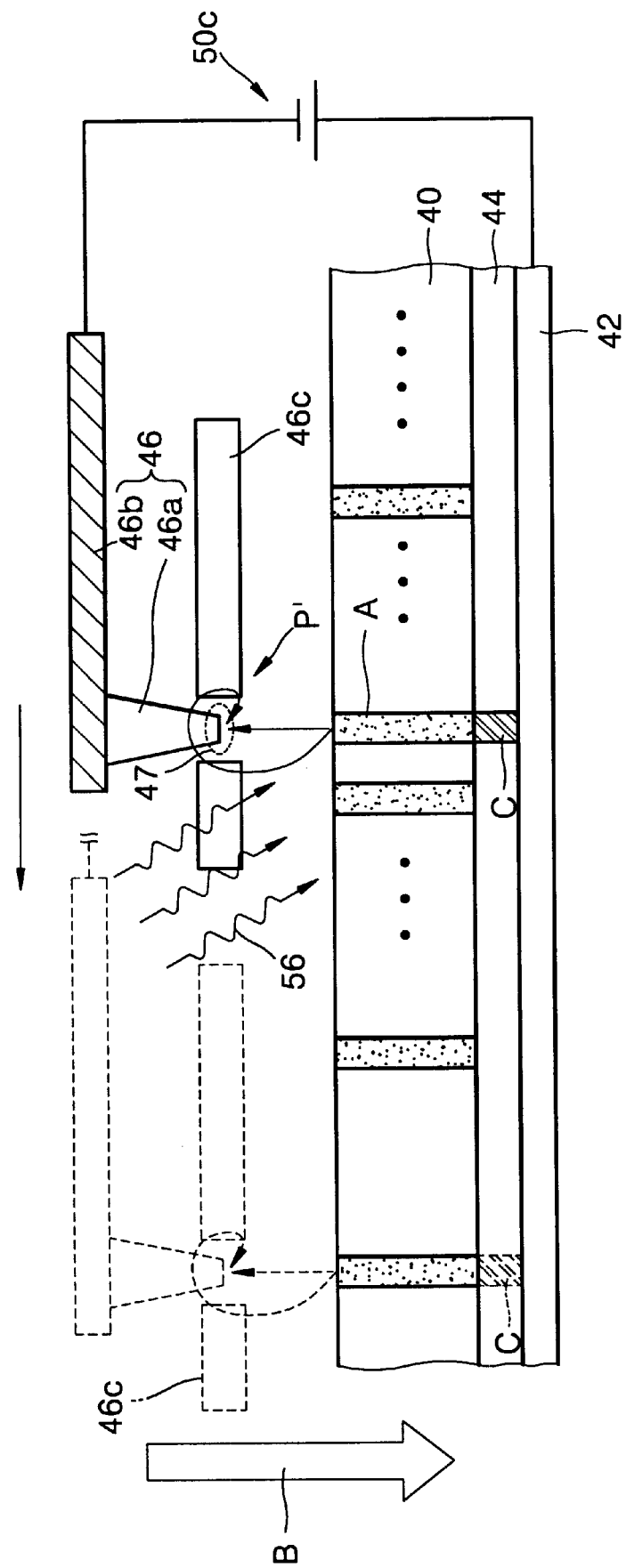
FIG. 13 is a diagram for explaining a method of reading information using the high-density information storage apparatus of FIG. 2.

Referring to FIG. 13, a fifth power supply 50c is connected between a lower electrode 42 and a charged particle emitting unit 46 to allow charged particles, which have been injected into a conductive region A of a recording medium 40, to be emitted straight above directly from the conductive region A. Here, a direction in which the voltage of the fifth power supply 50c is applied between the charged particle emitting unit 46 and the lower electrode 42 is opposite to that during the write operation. However, since charged particles emitted from the recording medium 40 must reach the emitter 46a, it is preferable that the level of voltage from the fifth power supply 50c is the same as that applied during the write operation.

According to the coherence between the recording medium 40 and the charge particles that have been injected into the recording medium 40 during the write operation, voltage necessary for causing the charged particles to be emitted from the recording medium 40 during read operation may be greater or smaller than the voltage necessary for causing the charged particles to be emitted from the emitter 46a during the write operation. Here, since the intensity of the electric field varies with the variation of the voltage, the influence of the electric field on the charged particles emitted from the recording medium 40 also changes.

It can be surmised from Equation (6) that the distance S between the charged particle emission point $S_0$ (FIG. 11) and the first point $F_1$ changes when the electric field E changes even if the magnetic field B is constant. This means that the distance traveled by a charged particle in one cycle changes. In other words, when the potential difference between the recording medium 40 and the emitter 46a changes in one cycle, a charged particle emitted from the recording medium 40 does not reach the tip area 47 but instead a point before or behind the tip area 47, thereby sharply decreasing the efficiency of charged particles. As a result, reading is difficult, or read information is not clear. Accordingly, when the voltage applied to the recording medium 40 and the emitter 46a during the read operation is different from that applied during the write operation, it is preferable to adjust the magnetic field B so that charged particles emitted from the recording medium 40 can reach the tip area 47 of the emitter 46a after making exactly one (or two or three) revolution(s). When considering the above case, it is preferable to use electromagnets as the first and second magnets 52 and 52a instead of using permanent magnets.

Subsequently, the emitter 46a is moved above a predetermined region of the recording medium 40 while the predetermined voltage is being applied to the lower electrode and the charged particle emitting unit 46. Thereafter, light 56 is radiated onto a predetermined region C of a photoconductive layer 44 contacting a predetermined region, e.g., a conductive region A, of the recording medium 40 directly below the emitter 46a by using the light radiating unit 54. The light radiation is continued until the read operation is completed. As a result, the predetermined region C of the photoconductive layer 44 is conductive so that the voltage applied to the lower electrode 42 can be applied to the conductive region A of the recording medium 40 through the predetermined region C of the photoconductive layer 44. As a result, a potential difference occurs between the recording medium 40 and the emitter 46a, thereby causing charged particles P' to be emitted from the conductive region A of the recording medium 40. Preferably, the charged particles P' are the same as the charged particles P that have been injected into the recording medium 40 during the write operation.

As in the write operation, the charged particles P' emitted from the recording medium 40 are influenced by an electric field induced due to the potential difference between the recording medium 40 and the emitter 46a and by the magnetic field B so that they can reach the emitter 46a. Accordingly, the charged particles P' emitted from the conductive region A of the recording medium 40 are able to reach the emitter 46a regardless of direction of the charged particles P' emitted upward from the recording medium 40, thereby increasing the efficiency of the charged particles P'.

As described above, when the charged particles P' emitted from the conductive region A of the recording medium 40 reach the tip area 47 of the emitter 46a, it is surmised that information written to the conductive region A of the recording medium 40 is read.

A power supply is not connected to the gate 46c while information is read from the recording medium 40 because the gate 46c itself prevents charged particles, which are not emitted straight above directly from a region of the recording medium 40 vertically below the emitter 46a, from being incident on the tip area 47 of the emitter 46a.

Meanwhile, since the direction of the magnetic field B influences only the rotating direction of an emitted charged particle, the direction of the magnetic field B formed during the read operation may be opposite to that of the magnetic field formed during the write operation if the intensity of the magnetic field B is constant. In this case, the charged particles P' emitted from the recording medium 40 still gather at the tip area 47 of the emitter 46a.

Thereafter, information written to other regions of the recording medium 40 is read through the above procedure as the emitter 46a is being moved.

<Erasing>

Erasing is performed to remove charged particles from the recording medium 40, that is, to restore the recording medium 40 to a blank state.

Referring to FIG. 14, the lower electrode 42 is grounded. If all the information on the recording medium 40 is to be erased, the photoconductive layer 44 may be grounded, as represented by the dotted lines of FIG. 14. However, if information in a predetermined region of the recording medium 40 is to be erased, it is preferable to ground only the lower electrode 42. After grounding the lower electrode 42, light is radiated onto a predetermined region of the photoconductive layer 44 contacting a region of the recording medium 40 from which information is erased using the light radiating unit 54 (FIG. 2). Here, it is preferable to perform the light radiation while considering the position of the light radiating unit 54.

For example, the light radiating unit 54 is provided at one side above the recording medium 40, as shown in FIG. 14. Thus it is preferable to partially and sequentially radiate light onto the photoconductive layer 44 starting from a certain portion of the photoconductive layer 44, instead of simultaneously radiating light onto the entire surface thereof. Here, a scanning radiation method of radiating light while moving the light radiating unit 54 lengthwise or widthwise may be used when the recording medium 40 is a non-rotary type. A rotary radiation method of rotating the recording medium 40 and moving the light radiating unit 54 in a predetermined direction may be used when the recording medium 40 is a rotary type.

Preferably, an erasing operation is performed after the emitter 46a is moved away from the recording medium 40. Here, the light radiating unit 54 may be moved above the recording medium 40 so that the entire surface of the recording medium 40 can be simultaneously irradiated with light.

Meanwhile, when the light radiating unit 54 is provided at the emitter holder 46b in combination with or separated from the emitter 46a, light can be radiated onto the photoconductive layer 44 by moving the emitter holder 46b above the recording medium 40 so that the photoconductive layer 44 can be made to be conductive.

Since the photoconductive layer 44 is made to be a conductive by irradiating with light as described above, charged particles injected into the recording medium are all discharged through the photoconductive layer 44 and the lower electrode 42. That is, information written to the recording medium 40 is completely erased. With such an arrangement, the recording medium 40 is restored to a state it was in before the charged particles were injected thereto.

As described above, the photoconductive layer 44 can be considered as a switching layer provided between the recording medium 40 and the lower electrode 42, and a predetermined region C of the photoconductive layer 44 contacting a conductive region A of the recording medium 40 can be considered to act like a switching device.

Accordingly, only if the photoconductive layer 44 is not made conductive, information written to the recording medium 40 can be maintained without being erased. Therefore, only if spontaneous discharge and damage do not occur in the recording medium 40, information written to the recording medium 40 can be permanently maintained without the need for an additional refreshing process.

The above description of the methods of writing, reading and erasing information and the maintenance of information can be applied to high-density information storage apparatuses according to the second through sixth embodiments.

As described above, a high-density information storage apparatus according to the present invention writes and reads information by radiating an electron beam onto a recording medium at a sufficient distance and erases information simply by radiating light onto the recording medium. Consequently, the present invention does not use a member such as the tip used for writing, reading and erasing information in a conventional information storage apparatus. Accordingly, a conventional problem of a damaged tip is avoided, and information processing speed during write, read and erasing operations is increased. In addition, since charged particles such as electrons are used for information processing, the information storage density of a recording medium can be increased compared to a conventional apparatus using a laser or probe.

Although this invention has been particularly shown and described with reference to preferred embodiments thereof, the invention should not be construed as being limited to the embodiments. For example, one skilled in the art can apply the technical idea of the present invention to a recording medium such as a CD or DVD, and can implement a high-density information storage apparatus including a second photoconductive layer at the bottom of the lower electrode 42, a plurality of recording mediums including a second recording medium, and charge particle emitting units for respective recording mediums. As described above, various modifications can be made to the embodiments without departing from the spirit of the present invention. Therefore, the scope of the present invention will be defined by the appended claims, not by the above embodiments.

What is claimed is:

1. A high-density information storage apparatus comprising:
    a lower electrode;
    a photoconductive layer and a recording medium sequentially provided on the lower electrode;
    conductive layer converting means for making the photoconductive layer conductive;
    data write and read means for writing data to the recording medium or reading data from the recording medium;
    data loss preventing means for preventing loss of data during data write and read operations; and
    a power supply connected to the lower electrode and the data write and read means, for supplying voltage necessary for reading and writing data.

2. The high-density information storage apparatus of claim 1, wherein the recording medium is a material layer in which the conductivity changes when charged particles are injected thereto and is realized as an amorphous dielectric substrate.

3. The high-density information storage apparatus of claim 1, wherein the data write and read means is charged particle emitting means which writes data by injecting charged particles into the recording medium and reads data by detecting charged particles emitted from the recording medium.

4. The high-density information storage apparatus of claim 3, further comprising a gate between the charged particle emitting means and the recording medium, the gate allowing only some of the charged particles emitted from the charged particle emitting means to reach the recording medium and vice-versa.

5. The high-density information storage apparatus of claim 4, wherein the power supply comprises:
   a first power supply for applying a predetermined voltage between the lower electrode and the gate; and
   a second power supply for applying a predetermined voltage between the gate and the charged particle emitting means.

6. The high-density information storage apparatus of claim 3, wherein the charged particle emitting means comprises:
   an emitter for emitting charged particles; and
   an emitter holder connected to the power supply and disposed above the recording medium, for controlling the motion of the emitter.

7. The high-density information storage apparatus of claim 6, wherein the data loss preventing means is charged particle control means for controlling charged particles emitted from the emitter so that they reach a predetermined region of the recording medium directly below the emitter or controlling charged particles emitted from the recording medium so that they reach the emitter directly above the recording medium.

8. The high-density information storage apparatus of claim 7, wherein the charged particle control means is a magnet.

9. The high-density information storage apparatus of claim 8, wherein the magnet comprises a first magnet provided above the emitter holder and a second magnet provided below the lower electrode.

10. The high-density information storage apparatus of claim 9, wherein the first and second magnets are realized as a single permanent magnet or as separated permanent magnets.

11. The high-density information storage apparatus of claim 9, wherein the first and second magnets are realized as a single electromagnet or as separated electromagnets that have opposite poles facing each other.

12. The high-density information storage apparatus of claim 8, wherein the magnet is an electromagnet surrounding at least the charged particle emitting means and the recording medium.

13. The high-density information storage apparatus of claim 1, wherein the conductive layer converting means is a light source radiating light onto the photoconductive layer and is provided proximal to and above the recording medium.

14. The high-density information storage apparatus of claim 6, wherein the conductive layer converting means is a light source radiating light onto the photoconductive layer and is provided at the emitter holder and surrounding the emitter.

15. The high-density information storage apparatus of claim 6, wherein the conductive layer converting means is a light source radiating light onto the photoconductive layer and is provided at the emitter holder but separated from the emitter.

16. The high-density information storage apparatus of claim 1, further comprising:
   a second photoconductive layer and a second recording medium onto which the conductive layer converting means radiates light, the second photoconductive layer and the second recording medium being sequentially provided on the lower surface of the lower electrode;
   second data write and read means provided below the second recording medium; and
   a power supply provided between the second photoconductive layer and the second data write and read means.

17. The high-density information storage apparatus of claim 16, wherein the data write and read means is charged particle emitting means which writes data by injecting charged particles into the recording medium and reads data by detecting charged particles emitted from the recording medium.

18. The high-density information storage apparatus of claim 17, wherein the second data write and read means is second charged particle emitting means which writes data by injecting charged particles into the second recording medium and reads data by detecting charged particles emitted from the second recording medium.

19. The high-density information storage apparatus of claim 18, further comprising a second gate between the second charged particle emitting means and the second recording medium, the second gate allowing only some of the charged particles emitted from the second charged particle emitting means to reach the second recording medium and vice-versa.

20. The high-density information storage apparatus of claim 19, wherein the power supply provided between the second photoconductive layer and the second data write and read means comprises:
   a third power supply for applying a predetermined voltage between the second photoconductive layer and the second gate; and
   a fourth power supply for applying a predetermined voltage between the second gate and the second charged particle emitting means.

21. The high-density information storage apparatus of claim 18, wherein the charged particle emitting means comprises:
   an emitter for emitting charged particles; and
   an emitter holder connected to the power supply and disposed above the recording medium, for controlling the motion of the emitter.

22. The high-density information storage apparatus of claim 21, wherein the second charged particle emitting means comprises:
   a second emitter for emitting charged particles; and
   a second emitter holder connected to the power supply and disposed above the second recording medium, for controlling the motion of the second emitter.

23. The high-density information storage apparatus of claim 22, wherein the data loss preventing means is charged particle control means for controlling charged particles emitted from the emitter so that they reach a predetermined region of the recording medium directly below the emitter or controlling charged particles emitted from the recording medium so that they reach the emitter directly above the recording medium, and for controlling charged particles emitted from the second emitter so that they reach a predetermined region of the second recording medium directly below the second emitter or controlling charged particles emitted from the second recording medium so that they reach the second emitter directly above the second recording medium.

24. The high-density information storage apparatus of claim 23, wherein the charged particle control means is a magnet.

25. The high-density information storage apparatus of claim 24, wherein the magnet comprises a first magnet provided above the emitter holder and a second magnet provided below the second emitter holder.

26. The high-density information storage apparatus of claim 24, wherein the magnet is an electromagnet surrounding at least the charged particle emitting means, the second charged particle emitting means, the recording medium, and the second recording medium.

27. The high-density information storage apparatus of claim 25, wherein the conductive layer converting means is a light source radiating light onto the photoconductive layer and the second photoconductive layer and comprises a first light source provided proximal to and above the charged particle emitting means and a second light source provided proximal to and below the second charged particle emitting means.

28. The high-density information storage apparatus of claim 25, wherein the conductive layer converting means is a light source radiating light onto the photoconductive layer and the second photoconductive layer and comprises a first light source provided at the emitter holder and surrounding the emitter and a second light source provided at the second emitter holder and surrounding the second emitter.

29. The high-density information storage apparatus of claim 25, wherein the conductive layer converting means is a light source radiating light onto the photoconductive layer and the second photoconductive layer and comprises a first light source provided at the emitter holder but separated from the emitter and a second light source provided at the second emitter holder but separated from the second emitter.

30. The high-density information storage apparatus of claim 25, wherein the lower electrode comprises a first lower electrode contacting the photoconductive layer and a second lower electrode contacting the second photoconductive layer and insulated from the first lower electrode.

31. The high-density information storage apparatus of claim 30, wherein the conductive layer converting means is a light source radiating light onto the photoconductive layer and the second photoconductive layer and is provided between the first and second lower electrodes in the shape of a plate.

32. The high-density information storage apparatus of claim 31, wherein the light source in the shape of a plate provided between the first and second lower electrodes comprises a first plate light source radiating light onto the photoconductive layer and a second plate light source radiating light onto the second photoconductive layer.

33. The high-density information storage apparatus of claim 24, wherein the lower electrode comprises a first lower electrode contacting the photoconductive layer and a second lower electrode contacting the second photoconductive layer and insulated from the first lower electrode, and the magnet comprises a first magnet provided above the emitter holder, a second magnet provided below the second emitter holder, and a third magnet provided between the first and second lower electrodes.

34. The high-density information storage apparatus of claim 33, wherein the conductive layer converting means radiates light onto the photoconductive layer and the second photoconductive layer and comprises a first light source provided proximal to and above the charged particle emitting means and a second light source provided proximal to and below the second charged particle emitting means.

35. The high-density information storage apparatus of claim 33, wherein the conductive layer converting means radiates light onto the photoconductive layer and the second photoconductive layer and comprises a first light source provided at the emitter holder and surrounding the emitter and a second light source provided at the second emitter holder and surrounding the second emitter.

36. The high-density information storage apparatus of claim 33, wherein the conductive layer converting means is a light source radiating light onto the photoconductive layer and the second photoconductive layer and comprises a first light source provided at the emitter holder but separated from the emitter and a second light source provided at the second emitter holder but separated from the second emitter.

37. The high-density information storage apparatus of claim 33, wherein the conductive layer converting means comprises:
a first light source provided between the first lower electrode and the third magnet, for radiating light onto the photoconductive layer; and
a second light source provided between the second lower electrode and the third magnet, for radiating light onto the second photoconductive layer.

38. An information writing method using a high-density information storage apparatus comprising a lower electrode, a photoconductive layer and a recording medium sequentially provided on the lower electrode, light radiating means for making the photoconductive layer conductive; charged particle emitting means provided on the recording medium, charged particle loss preventing means for preventing loss of charged particles while injecting the charged particles into the recording medium using the charged particle emitting means, and a power supply for supplying a predetermined voltage to the lower electrode and the charged particle emitting means, the information writing method comprising:
a first step of adjusting the distance between the recording medium and a charged particle emitting area of the charged particle emitting means; and
a second step of injecting charged particles into the recording medium, thereby forming a conductive region corresponding to predetermined data in the recording medium.

39. The information writing method of claim 38, wherein some of the charged particles emitted from the charged particle emitting area is absorbed in the second step.

40. The information writing method of claim 39, wherein the charged particles are injected under the influence of a magnetic field so that all charged particles which are not absorbed among the charged particles emitted from the charged particle emitting area reach a predetermined region of the recording medium directly below the charged particle emitting area.

41. The information writing method of claim 40, wherein the magnetic field is induced using a first magnet provided above the charged particle emitting means and a second magnet provided below the lower electrode.

42. The information writing method of claim 40, wherein the magnetic field is induced using an electromagnet surrounding at least the recording medium and the charged particle emitting area.

43. The information writing method of claim 42, wherein the intensity of the magnetic field is adjusted by adjusting current flow through the electromagnet so that the charged particles emitted from the charged particle emitting area can reach the predetermined region of the recording medium directly below the charged particle emitting area even when the initial distance between the recording medium and the charged particle emitting area changes.

44. The information writing method of claim 40, wherein in the second step, the photoconductive layer is irradiated with light.

45. An information reading method using a high-density information storage apparatus comprising a lower electrode, a photoconductive layer and a recording medium sequentially provided on the lower electrode, light radiating means for making the photoconductive layer conductive; charged particle emitting means provided on the recording medium, charged particle loss preventing means for preventing loss of charged particles between the recording medium and the charged particle emitting means, and a power supply for supplying a predetermined voltage to the lower electrode and the charged particle emitting means, the information reading method comprising:

a first step of adjusting the distance between the recording medium and a charged particle emitting area of the charged particle emitting means; and a second step of reading data from the recording medium by recognizing charged particles emitted from the recording medium while moving the charged particle emitting area above the recording medium.

46. The information reading method of claim 45, wherein some of the charged particles emitted from the recording medium are blocked before reaching the charged particle emitting area.

47. The information reading method of claim 46, wherein the charged particles are emitted from the recording medium under the influence of a magnetic field having a predetermined intensity so that all charged particles which are not blocked among the charged particles emitted from the recording medium reach the charged particle emitting area.

48. The information reading method of claim 47, wherein the magnetic field is induced using a first magnet provided above the charged particle emitting means and a second magnet provided below the lower electrode.

49. The information reading method of claim 48, wherein the first and second magnets are electromagnets.

50. The information reading method of claim 47, wherein the magnetic field is induced using an electromagnet surrounding at least the recording medium and the charged particle emitting area.

51. The information reading method of claim 49, wherein the intensity of the magnetic field is adjusted by adjusting current flow through the electromagnet so that the charged particles emitted from the recording medium can reach the charged particle emitting area directly above the recording medium even when the distance between the recording medium and the charged particle emitting area changes.

52. The information reading method of claim 47, wherein in the second step, a predetermined region of the photoconductive layer corresponding to a region from which the charged particles are emitted in the recording medium is converted into a conductive region.

53. The information reading method of claim 52, wherein the predetermined region of the photoconductive layer is irradiated with light, thereby converting the predetermined region into a conductive region.

54. An information erasing method using a high-density information storage apparatus comprising a lower electrode, a photoconductive layer and a recording medium sequentially provided on the lower electrode, light radiating means for making the photoconductive layer conductive; charged particle emitting means provided on the recording medium, charged particle loss preventing means for preventing loss of charged particles between the recording medium and the charged particle emitting means, and a power supply for supplying a predetermined voltage to the lower electrode and the charged particle emitting means, the information erasing method comprising:

a first step of grounding the lower electrode; and a second step of discharging charged particles injected into the recording medium through lower electrode by converting the photoconductive layer into a conductive layer, thereby erasing data from the recording medium.

55. The information erasing method of claim 54, wherein the second step discharges the charged particles injected into a predetermined region of the recording medium contacting the photoconductive layer through the lower electrode by selectively converting a predetermined region of the photoconductive layer into a conductive layer, thereby selectively and partially erasing data from the recording medium.

56. An information erasing method using a high-density information storage apparatus comprising a lower electrode, a photoconductive layer and a recording medium sequentially provided on the lower electrode, light radiating means for giving conductivity to the photoconductive layer; charged particle emitting means provided on the recording medium, charged particle loss preventing means for preventing loss of charged particles between the recording medium and the charged particle emitting means, and a power supply for supplying a predetermined voltage to the lower electrode and the charged particle emitting means, the information erasing method comprising:

a first step of grounding the lower electrode; and a second step of discharging all charged particles injected into the recording medium through lower electrode by converting the entire photoconductive layer into a conductive layer, thereby entirely erasing all data from the recording medium.

57. The high-density information storage apparatus of claim 26, wherein the conductive layer converting means is a light source radiating light onto the photoconductive layer and the second photoconductive layer and comprises a first light source provided proximal to and above the charged particle emitting means and a second light source provided proximal to a dn below the second charged particle emitting means.

58. The high-density information storage apparatus of claim 26, wherein the conductive layer converting means is a light source radiating light onto the photoconductive layer and the second photoconductive layer and comprises a first light source provided at the emitter holder and surrounding the emitter and a second light source provided at the second emitter holder and surrounding the second emitter.

59. The high-density information storage apparatus of claim 26, wherein the conductive layer converting means is a light source radiating light onto the photoconductive layer and the second photoconductive layer and comprises a first light source provided at the emitter holder but separated from the emitter and a second light source provided at the second emitter holder but separated from the second emitter.

60. The high-density information storage apparatus of claim 26, wherein the lower electrode comprises a first lower electrode contacting the photoconductive layer and a second lower electrode contacting the second photoconductive layer and insulated from the first lower electrode.

* * * * *